(12) United States Patent
Marzy et al.

(10) Patent No.: US 7,703,429 B2
(45) Date of Patent: Apr. 27, 2010

(54) BALANCING SHAFT UNIT

(75) Inventors: Roland Marzy, Steyr (AT); Michael Messing, Sierning (AT); Andreas Hölzl, Wieselburg (AT); Ewald Sieberer, Steinbach (AT)

(73) Assignee: Magna Powertrain AG & Co KG, Lannach (AT)

( * ) Notice: Subject to any disclaimer, the term of this patent is extended or adjusted under 35 U.S.C. 154(b) by 191 days.

(21) Appl. No.: 11/980,334

(22) Filed: Oct. 30, 2007

(65) Prior Publication Data
US 2008/0202463 A1 Aug. 28, 2008

(30) Foreign Application Priority Data
Nov. 3, 2006 (DE) .................. 10 2006 051 996

(51) Int. Cl.
*F02B 75/06* (2006.01)
(52) U.S. Cl. ..................... 123/192.2; 74/603
(58) Field of Classification Search ........... 123/192.2; 74/603
See application file for complete search history.

(56) References Cited

U.S. PATENT DOCUMENTS
5,875,753 A 3/1999 Ishikawa

FOREIGN PATENT DOCUMENTS
| DE | 44 12 476 A1 | | 10/1995 |
| DE | 10041185 A1 | * | 3/2002 |
| JP | 03275908 A | * | 12/1991 |
| WO | 01/29447 A1 | | 4/2001 |

* cited by examiner

*Primary Examiner*—Noah Kamen
(74) *Attorney, Agent, or Firm*—Harness, Dickey & Pierce, P.L.C.

(57) ABSTRACT

A balancing shaft unit for balancing inertia or torque in an internal combustion engine of a motor vehicle. The balancing shaft unit includes a housing part and at least one balancing shaft having at least one counterweight. The housing part is made in one piece and has at least two integrated bearing sections with a respective bearing opening. A respective cut-out is formed at longitudinal ends of the balancing shaft in which a respective bearing pin is arranged that is rigidly connected to the balancing shaft and which has a cylindrical bearing section that is supported in a respective one of the bearing openings.

19 Claims, 3 Drawing Sheets

BALANCING SHAFT UNIT

CROSS-REFERENCE TO RELATED APPLICATIONS

This application claims the benefit of German Patent Application 10 2006 051 996.5 filed Nov. 3, 2006. The disclosure of the above application is incorporated herein by reference in its entirety.

FIELD

The present disclosure relates to a balancing shaft unit for balancing inertia or torque in an internal combustion engine of a motor vehicle.

BACKGROUND

The statements in this section merely provide background information related to the present disclosure and may not constitute prior art.

Balancing shafts balance inertia forces and inertia torques that arise in internal combustion engines. With in-line engines having four cylinders, for example, such balancing shafts are used in pairs, with the balancing shafts rotating in opposite directions at double the crankshaft speed. The balancing shafts, as well as the components bearing them, are subject to high load due to the high speed.

Balancing shaft units having a housing and a balancing shaft, or a pair of balancing shafts, are generally known. Such known balancing shaft units, however, although able to withstand the high loads and reliably compensate the inertia forces and inertia torques, are undesirably complex and/or expensive to manufacture.

SUMMARY

The present disclosure provides a balancing shaft unit that satisfies demands of high precision of the bearing of the balancing shaft with reliable fastening and high stability, but which simultaneously takes up as little construction space as possible and is cost-effective to manufacture.

The balancing shaft unit for balancing inertia or torque for internal combustion engines includes a housing part and at least one balancing shaft having at least one counterweight. The housing part is made in one piece and has at least two integrated bearing sections with a respective bearing opening. The bearing openings are therefore not formed, for example, by split bearing supports or the like.

The balancing shaft unit may be characterized in that a respective cut-out may be formed at the two longitudinal ends of the balancing shaft and a respective bearing pin may be arranged in the cut-out. This bearing pin may be rigidly connected to the balancing shaft and may have a cylindrical bearing section which may be supported in a respective one of the bearing openings.

In other words, the balancing shaft unit only has one single housing part for the fastening and bearing of the balancing shaft. The at least one balancing shaft may be supported at this housing part by means of bearing pins. The bearing sections of the bearing pins are arranged in the bearing openings of the bearing sections of the housing part. In the simplest case, a balancing shaft unit may only include a balancing shaft with a counterweight, a housing part, and two bearing pins.

The manufacturing costs may be reduced by the low number of components. Such a balancing shaft unit may also be assembled in a few simple steps, which additionally result in cost savings. A reduction in the number of the required components and of the required assembly steps also improves the process security in manufacture. The one-part construction of the housing part also has an advantageous effect on the stability of the balancing shaft unit.

The balancing shaft and the at least one counterweight may be made in one piece, which results in an additional reduction in the number of components. A complex positioning and adjustment of the counterweights is thus dispensed with.

The bearing sections of the bearing pins may be surrounded by bearing bushes in accordance with the expected loads. Such plain bearing bushings may advantageously be made in one piece, which increases the load capacity.

The rigid connection of the bearing pins to the balancing shaft may be realized in a particularly simple manner by a press fit of the bearing pins in the respective cut-outs of the balancing shaft.

The length of the balancing shaft may correspond to the spacing between the bearing sections of the housing part or may be shorter than this spacing.

The bearing pins may have a respective securing collar at their free ends, which may be radially widened with respect to the bearing section of the respective bearing pin and which may effect a simple axial fixing of the balancing shaft at the bearing sections of the housing part.

At least one bearing pin may have a gear which may be arranged at the end of the bearing pin remote from the balancing shaft. The bearing pin and the gear may be made in one piece.

Such a gear can simultaneously represent the above-mentioned securing collar of the respective bearing pin.

Furthermore, at least one of the bearing sections of the housing part may have an additional bearing opening for the reception of a shaft driving the balancing shaft or of a transmission shaft provided for the drive of the balancing shaft. This permits a particularly compact and stable construction of the balancing shaft unit.

In a particularly light and cost-favorable configuration of the housing part, which is nevertheless stable, the housing part may be substantially formed by a connection web, which connects the bearing sections to one another.

Further areas of applicability will become apparent from the description provided herein. It should be understood that the description and specific examples are intended for purposes of illustration only and are not intended to limit the scope of the present disclosure.

DRAWINGS

The invention will be described in the following purely by way of example with reference to advantageous embodiments and to the drawings. There are shown:

FIG. 1b is a schematic sectional view through a bearing section of the balancing shaft unit shown in FIG. 1a;

DETAILED DESCRIPTION

The following description is merely exemplary in nature and is not intended to limit the present disclosure, application, or uses.

Figure 1A:
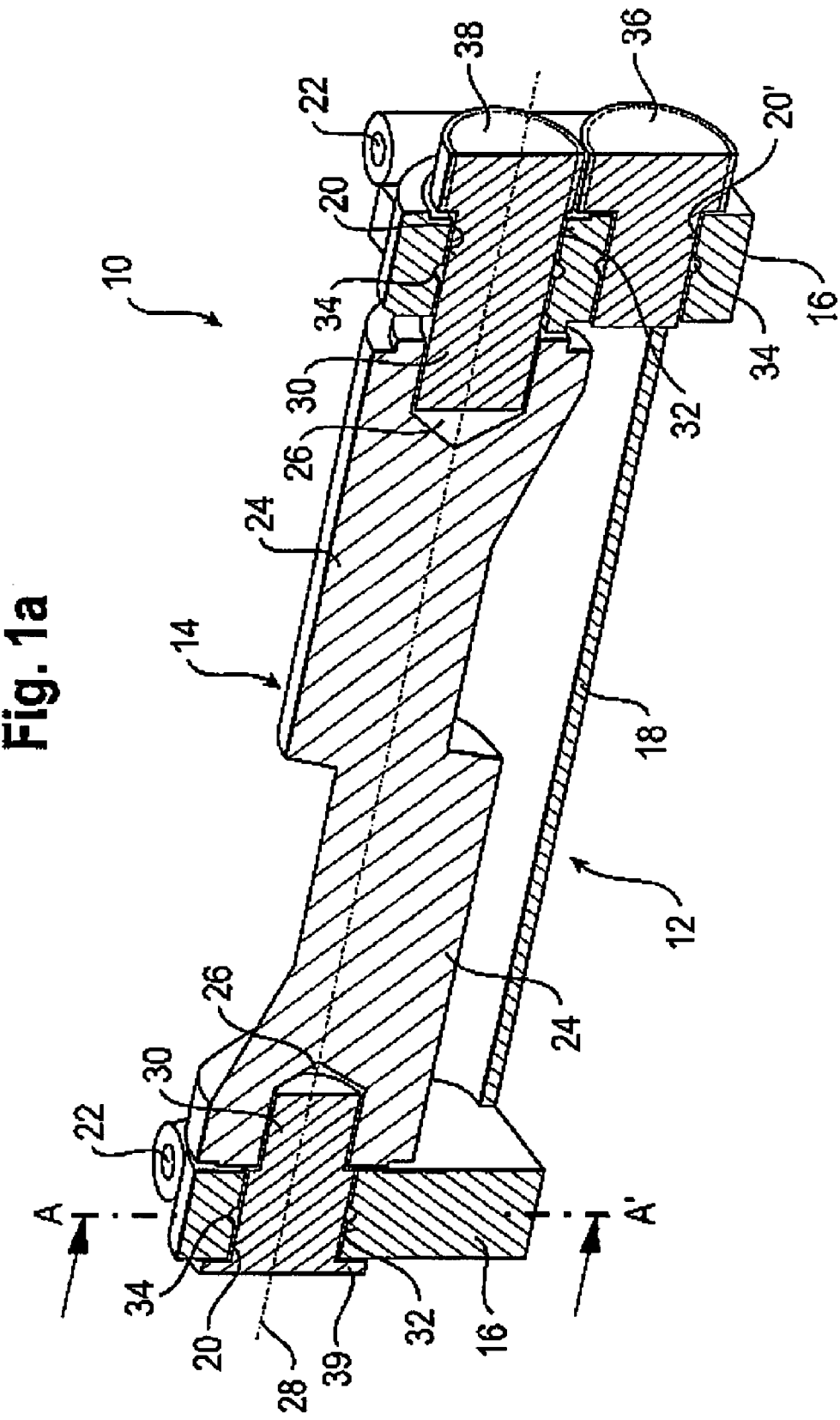
FIG. 1a is a schematic representation of a balancing shaft unit in a perspective sectional view.

FIG. 1a schematically shows a balancing shaft unit 10. The balancing shaft unit 10 for balancing inertia or torque in an internal combustion engine (not shown) includes a one-piece housing part 12 and a balancing shaft 14.

The housing part 12 has two bearing sections 16, which are shaped on a connection web 18. The two bearing sections 16 substantially extend along a respective normal plane to the longitudinal axis of the connection web 18. Bearing openings 20 are provided in the bearing sections 16. Fastening bores 22 permit the fastening of the balancing shaft unit 10 to the engine (not shown).

The balancing shaft 14 is arranged between the bearing sections 16 of the housing part 12, with the balancing shaft 14 having integrated counterweights 24. In other words, the balancing shaft 14 and the counterweights 24 are made in one piece.

The two end faces of the balancing shaft 14 are provided with axial cut-outs 26, which are arranged coaxially to a rotational axis 28 of the balancing shaft 14. The cut-outs 26, for example bores, are provided for the mounting of bearing pins 30 to be inserted axially. The bearing pins 30 are rigidly connected to the balancing shaft 14 by means of a press fit. The both rotationally fixed and axially fixed connection can be realized, for example, by a shrunk connection. In this connection, the bearing pins 30 may be cooled before they are guided through the bearing openings 20 into the cut-outs 26 so that the periphery of the ends of the bearing pins 30 facing the balancing shaft 14 is briefly reduced. The dimensions of the bearing pins 30 or of the cut-outs 26 may be dimensioned such that the bearing pins 30 may easily be guided into the respective cut-out 26 in a cold state. On a subsequent heating of the bearing pins 30 to the temperature of the balancing shaft 14, they expand again and press into the respective cut-out 26. A reliable connection that may be loaded to a high degree is thus established between the bearing pins 30 and the balancing shaft 14. Optionally, the balancing shaft 14 may also be briefly heated to effect this shrunk connection.

The bearing pins 30 each have a cylindrical bearing region 32, which is supported in a respective one of the bearing openings 20 of the bearing sections 16 of the housing part 12. In this connection, the respective bearing section 16 of the housing part 12 surrounds the respective bearing region 32 of the bearing pin 30 peripherally in one piece. No bearing sections for the bearing of the balancing shaft 14 in the bearing openings 20 are, therefore, provided at the balancing shaft 14 itself. The lubrication of the plain bearings formed by the bearing regions 32 of the bearing pins 30 and the bearing openings 20 is ensured by the supply of lubricant through ring grooves 34, which are in turn supplied with lubricant through lubricant passages (not shown).

The housing part 12 may also have a bearing opening 20' at one of the bearing sections 16, which serves for the reception of an intermediate shaft (i.e., a shaft driving the balancing shaft 14 or a transmission shaft provided for the drive of the balancing shaft). In the configuration shown, a short shaft section is arranged in the bearing opening 20' and has a synchronized wheel 36, which may in turn be driven by a drive gear (not shown), for example.

The synchronized wheel 36 formed as a gear meshes with a gear 38 that is an integral part of the bearing pin 30 at the right in the representation in accordance with FIG. 1a. The gear 38 for the drive of the balancing shaft 14 may, however, also generally be a separate component that is connected to the bearing pin 30 by a press fit, for example.

The gear 38 simultaneously forms a securing collar of the respective bearing pin 30 that provides an axial securing of the balancing shaft 14 to the respective bearing section 16 of the housing part 12. At the other bearing pin 30, this function may be satisfied by a separately provided securing collar 39 which may be formed integrally with bearing pin 30.

As can be seen from FIG. 1a, the balancing shaft unit 10 is a component that consists of a few individual parts. Costs are thereby saved for the individual components in manufacture, on the one hand, and the assembly of the balancing shaft unit 10 is also simplified, on the other hand.

Figure 1B:
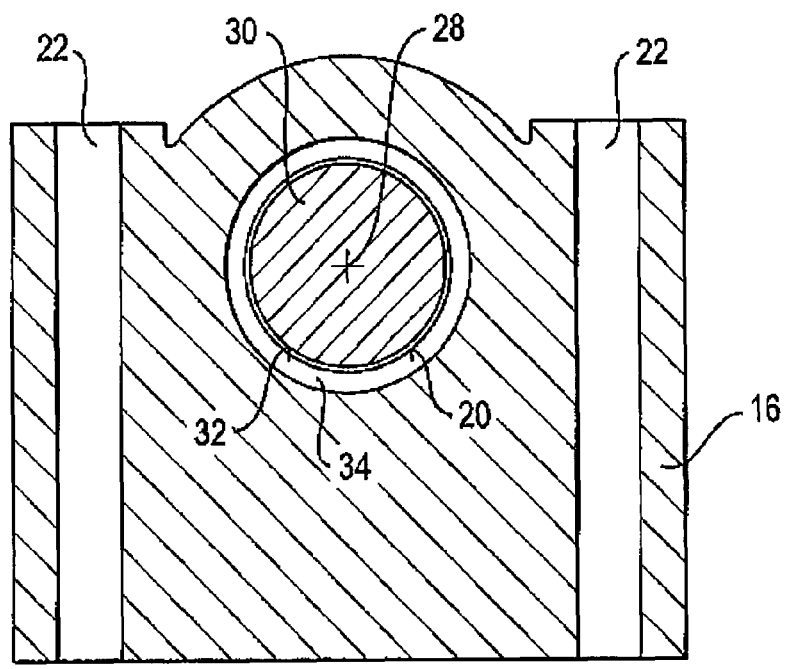

FIG. 1b shows a section through the bearing section 16 of the balancing shaft 10 at the left in the representation in accordance with FIG. 1a. The sectional plane is perpendicular to the rotational axis 18 in the position indicated by the line AA' (FIG. 1a). As already stated, the bearing region 32 of the bearing pin 30 is arranged in the bearing opening 20 of the bearing section 16. FIG. 1b illustrates that the bearing section 16 of the housing part 12 has no separation surface. The bearing opening 20 may be, therefore, formed in a single component. Thus, two bearing supports or similar components are not provided that only form the bearing opening 20 in an assembled state. The intermediate space between the bearing region 32 and the bearing opening 20 and the ring groove 34 are shown with excessive height for illustration. A lubricant passage supplying the ring groove 34 with lubricant is not shown.

On the assembly of the balancing shaft unit 10, the balancing shaft 14 is arranged between the bearing sections 16 of the housing part 12. Subsequently, the bearing pins 30 are fastened to the balancing shaft 14 in the manner described above. In the simplest case, the balancing shaft unit may only consist of four components. Namely, two bearing pins 30, a balancing shaft 14, and a housing part 12.

Figure 2:
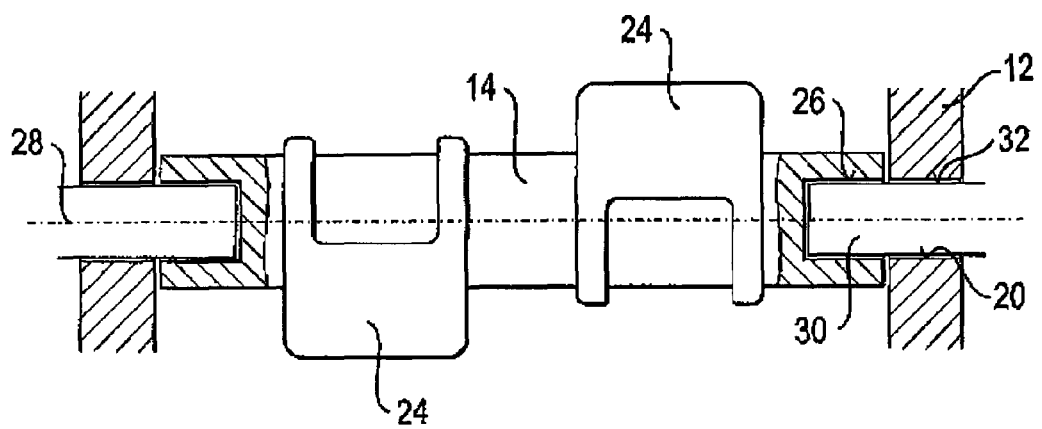
FIG. 2 is a schematic representation of another balancing shaft unit in a partly sectional view.

In FIG. 2, an alternative configuration of the balancing shaft unit 10 is shown schematically. In this case, the balancing shaft 14 is not made in one piece, but includes two separate counterweights 24. The counterweights 24 may be connected to the balancing shaft 14 in various manners. For example, the counterweights 24 may be fastened to the balancing shaft 14 by a press fit or by means of screws, locating pins, clamping sleeves, or by weld connections.

Figure 3:
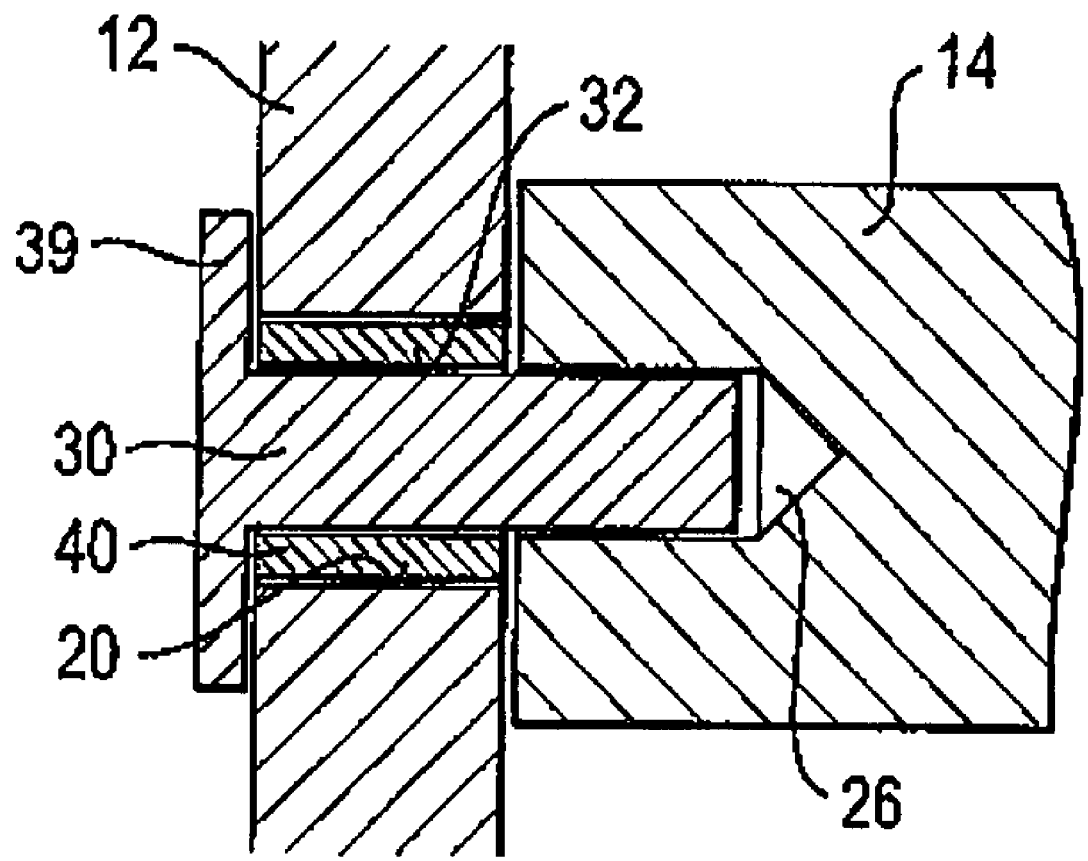
FIG. 3 is a bearing pin surrounded by a bearing sleeve in a sectional view.

FIG. 3 shows a bearing sleeve 40 that is arranged between the bearing region 32 of the bearing pin 30 and the bearing opening 20. Such a bearing sleeve 40 may be made in one piece to be able to withstand the high loads which occur on operation of the balancing shaft unit 10. However, a bearing of the bearing pins 30 directly in the bearing openings 20 is sufficient for a number of applications.

The balancing shaft unit may also, for example, include a cylindrical tube, in addition to the above-identified components. The cylindrical tube may surround at least one balancing shaft to prevent a foaming of the surrounding lubricant during operation. Additional housing parts may be provided to cover the balancing shaft unit.

What is claimed is:

1. A balancing shaft unit for balancing inertia or torque in an internal combustion engine of a motor vehicle, comprising:
   a housing part; and
   at least one balancing shaft having at least one counterweight,
   wherein the housing part is made in one piece and has at least two integrated bearing sections that each have a respective bearing opening, and
   a respective cut-out is formed at longitudinal ends of the balancing shaft in which a respective bearing pin is arranged that is rigidly connected to the balancing shaft and that has a cylindrical bearing section supported in a respective one of the bearing openings, wherein at least one of the bearing pins has a gear arranged at a side of the associated bearing section of the housing part remote from the balancing shaft.

2. The balancing shaft unit in accordance with claim 1, wherein the respective bearing section of the housing part peripherally surrounds the respective bearing section of the bearing pin in one piece.

3. The balancing shaft unit in accordance with claim 1, wherein the balancing shaft and the at least one counterweight are made in one piece.

4. The balancing shaft unit in accordance with claim 1, wherein the cut-outs (26) are blind holes.

5. The balancing shaft unit in accordance with claim 1, wherein the bearing sections of the bearing pins are surrounded by one-piece bearing sleeves.

6. The balancing shaft unit in accordance with claim 1, wherein the bearing pins are connected to the balancing shaft by a press fit.

7. The balancing shaft unit in accordance with claim 6, wherein the press fit is formed by a shrunk connection.

8. The balancing shaft unit in accordance with claim 1, wherein a length of the balancing shaft corresponds to a spacing between the bearing sections of the housing part or is shorter than the spacing.

9. The balancing shaft unit in accordance with claim 1, wherein at least one of the bearing pins has a securing collar at a side of the associated bearing section of the housing part remote from the balancing shaft.

10. The balancing shaft unit in accordance with claim 9, wherein the securing collar of the bearing pin has a diameter which is larger than the diameter of the bearing section of the bearing pin and than the clear diameter of the associated bearing opening of the housing part.

11. The balancing shaft unit in accordance with claim 1, wherein the bearing pin and the gear are made in one piece.

12. The balancing shaft unit in with claim 1, wherein at least one of the bearing sections of the housing part has an additional bearing opening for the reception of an intermediate shaft driving the balancing shaft.

13. The balancing shaft unit in accordance with claim 1, wherein the housing part substantially includes the two bearing sections and a connection web which connects the bearing sections to one another.

14. A method for the assembly of a balancing shaft unit for balancing inertia or torque in an internal combustion engine of a motor vehicle, the balancing shaft unit including a housing part and at least one balancing shaft having at least one counterweight, the housing part being made in one piece and having at least two integrated bearing sections each having a respective bearing opening, a respective cut-out being formed at longitudinal ends of the balancing shaft in which a respective bearing pin is arranged that is rigidly connected to the balancing shaft and which has a cylindrical bearing section which is supported in a respective one of the bearing openings, the method comprising the steps of arranging the balancing shaft between the bearing sections of the housing part;

fixing a gear to one of the bearing pins; and subsequently connecting the bearing pins to the balancing shaft in that the bearing pins are introduced through the bearing openings of the bearing sections of the housing part into the corresponding cut-outs of the balancing shaft, wherein the gear is positioned on an opposite side of the associated bearing section as the counterweight.

15. The method in accordance with claim 14, wherein the bearing pins are connected to the balancing shaft by a shrunk connection.

16. A balancing shaft unit for balancing inertia or torque in an internal combustion engine of a motor vehicle, comprising:

a housing part; and at least one balancing shaft having at least one counterweight, wherein the housing part is made in one piece and has at least two integrated bearing sections that each have a respective bearing opening, and a respective cut-out is formed at longitudinal ends of the balancing shaft in which a respective bearing pin is arranged that is rigidly connected to the balancing shaft and that has a cylindrical bearing section supported in a respective one of the bearing openings, wherein the balancing shaft and the at least one counterweight are made in one piece.

17. The balancing shaft unit in accordance with claim 16, wherein the bearing sections of the bearing pins are surrounded by one-piece bearing sleeves.

18. The balancing shaft unit in accordance with claim 16, wherein the bearing pins are connected to the balancing shaft by a press fit.

19. The balancing shaft unit in accordance with claim 16, wherein a length of the balancing shaft corresponds to a spacing between the bearing sections of the housing part or is shorter than the spacing.

* * * * *